(12) United States Patent
Takahashi et al.

(10) Patent No.: US 11,639,314 B2
(45) Date of Patent: May 2, 2023

(54) POROUS FIRED GRANULATED BODY AND METHOD FOR MANUFACTURING THE SAME

(71) Applicant: Itochu Ceratech Corporation, Seto (JP)

(72) Inventors: Akira Takahashi, Seto (JP); Junya Shimosato, Seto (JP); Takahiko Nakamura, Seto (JP); Noriyuki Tamura, Seto (JP)

(73) Assignee: Itochu Ceratech Corporation, Seto (JP)

( * ) Notice: Subject to any disclaimer, the term of this patent is extended or adjusted under 35 U.S.C. 154(b) by 611 days.

(21) Appl. No.: 16/792,585

(22) Filed: Feb. 17, 2020

(65) Prior Publication Data
US 2020/0181030 A1 Jun. 11, 2020

Related U.S. Application Data (62) Division of application No. 15/546,372, filed as application No. PCT/JP2015/052795 on Feb. 2, 2015, now abandoned.

(51) Int. Cl.
| | |
|---|---|
| *C04B 38/00* | (2006.01) |
| *C04B 35/111* | (2006.01) |
| *C04B 35/626* | (2006.01) |
| *C04B 35/634* | (2006.01) |
| *C04B 38/06* | (2006.01) |
| *C04B 111/00* | (2006.01) |

(52) U.S. Cl.
CPC ........ *C04B 38/0051* (2013.01); *C04B 35/111* (2013.01); *C04B 35/62685* (2013.01);
(Continued)

(58) Field of Classification Search
CPC ........ C04B 35/62695; C04B 36/62685; B28B 1/004
See application file for complete search history.

(56) References Cited

U.S. PATENT DOCUMENTS 4,307,051 A * 12/1981 Sargeant ............... C04B 38/009
264/117
5,922,403 A 7/1999 Tecle
(Continued)

FOREIGN PATENT DOCUMENTS

| JP | 63-176385 A | 7/1988 |
|---|---|---|
| JP | 02-160679 A | 6/1990 |

(Continued)

OTHER PUBLICATIONS

International Search Report dated Apr. 21, 2015, issued for PCT/JP2015/052795.

*Primary Examiner* — Erin Snelting
(74) *Attorney, Agent, or Firm* — Locke Lord LLP (57) ABSTRACT

A porous fired granulated body is formed by consolidating numerous alumina particles to each other while letting mainly interconnected pores remain in network form across an entire cross section of a granulated body particle. The pores have an inner diameter controlled by a droplet diameter of a pore forming agent and have numerous precipitated alumina crystals formed on inner surfaces thereof. Manufacture is performed by spraying the pore forming agent (emulsion) onto a raw material to form a coating layer of the pore forming agent on a surface of the raw material particle and controlling the inner diameter of the pores. A porous fired granulated body of alumina having a high specific surface area and having higher strength for the same specific surface area can thus be provided by a simple manufacturing method.

8 Claims, 5 Drawing Sheets

(52) U.S. Cl.
CPC ...... *C04B 35/62695* (2013.01); *C04B 35/634* (2013.01); *C04B 38/009* (2013.01); *C04B 38/067* (2013.01); *C04B 2111/0081* (2013.01); *C04B 2235/3217* (2013.01); *C04B 2235/3218* (2013.01); *C04B 2235/60* (2013.01)

(56) References Cited

U.S. PATENT DOCUMENTS

| | | | |
|---|---|---|---|
| 6,245,439 B1 * | 6/2001 | Yamada | ............. C22C 1/10 428/116 |
| 6,472,075 B1 * | 10/2002 | Niwa | ............. C04B 33/32 428/408 |
| 2002/0142146 A1 * | 10/2002 | Gadow | ............. F16D 69/023 428/292.1 |
| 2003/0082100 A1 | 5/2003 | Kolenda et al. | |
| 2005/0118097 A1 | 6/2005 | Sakon et al. | |

FOREIGN PATENT DOCUMENTS

| | | |
|---|---|---|
| JP | 04-110042 A | 4/1992 |
| JP | 08-245281 A | 9/1996 |
| JP | 2001-270783 A | 10/2001 |
| JP | 2003-048768 A | 2/2003 |
| JP | 2005-154227 A | 6/2005 |
| JP | 2006-089345 A | 4/2006 |

* cited by examiner

Fig. 4(1) Primary spraying

Fig. 4(2) Secondary spraying
(Primary granulation)

Fig. 4(3) Binder spraying
Secondary granulation

Fig. 6A (50 times magnification)

(1000 times magnification)

Example

Fig. 6B (50 times magnification)

(1000 times magnification)

Comparative Example 1

Fig. 6C (50 times magnification)

(1000 times magnification)

Comparative Example 2

POROUS FIRED GRANULATED BODY AND METHOD FOR MANUFACTURING THE SAME

This Application is a Division of U.S. patent application Ser. No. 15/546,372 filed on Jul. 26, 2017, which is National Stage Entry of PCT Application No. PCT/JP2015/052795 filed on Feb. 2, 2015. The entire contents of these applications are incorporated herein by reference in their entirety.

FIELD OF THE ART

The present invention relates to a porous fired granulated body and a method for manufacturing the same.

Here, "fired" refers to consolidating a granulated body, constituted of numerous ceramic particles, as represented by alumina particles, by high temperature processing at not less than a temperature (for example, of 700° C.) at which precipitated alumina crystals are obtained inside pores. However, complete sintering, by which the pores become completely blocked, is not included.

In the description that follows, "%" and "parts," which indicate units of mixing, signify "% by mass" and "parts by mass" unless noted otherwise.

Also, the respective characteristic values are defined as follows.

"Mean particle diameter" . . . Signifies a median diameter that is a value measured by a laser diffraction method (in cases where the mean particle diameter is less than 50 μm) or by JIS standard sieves (in cases where the mean particle diameter is not less than 50 μm).

"Specific surface area" . . . Value measured in compliance with JIS Z 8830 "Determination of the specific surface area of powders by gas adsorption-BET method."

"Sphericity" . . . Arithmetic mean value (n=10) measured by a binary measurement method based on an image analysis method using a scanning electron microscope (SEM).

"Pore diameter" . . . Arithmetic mean value (n=10) measured by a binary measurement method in an image analysis method using a scanning electron microscope (SEM).

"Compressive strength" . . . Value measured in compliance with JIS R 1608 "Testing methods for compressive strength of fine ceramics."

"Precipitated crystal size" . . . Arithmetic mean value (biaxial mean diameter) (n=10) of major diameters and minor diameters of precipitated crystals measured by a scanning electron microscope (SEM).

"Soda component" . . . Value measured in compliance with JIS R 2216 "Methods for X-ray fluorescence spectrometric analysis of refractory products."

BACKGROUND ART

Based on its high heat resistance and low reactivity, alumina is put to diverse uses. In particular, porous bodies of α-alumina are used in various applications as a material for functional products and in catalyst carriers, immobilized microorganism beds, culture beds, and filter media.

Such porous bodies of alumina are required to be usable simply and inexpensively as high-strength catalyst carriers capable of being controlled in pore distribution and to have a low soda content (Patent Document 1).

To meet these requirements, a method for manufacturing an α-alumina formed body (granulated body) of the following arrangement is proposed in Patent Document 1 (Claim 1, Abstract, etc.).

"A method for manufacturing an α-alumina formed body where an alumina powder, having a rehydrating property at least partially and being obtained by calcining gibbsite crystalline aluminum hydroxide of controlled particle diameter and tamped density, is mixed with water and the mixture is formed to obtain a formed body, the formed body is rehydrated by being kept in a humid atmosphere or in steam of 110 to 200° C., and then the rehydrated formed body is fired at not less than 1200° C."

In paragraphs 0051 to 0052 of Patent Document 1, it is stated that a powder raw material of calcined rehydratable alumina is made into a spherical granulated body of 2 to 4 mm diameter using a tumbling disk granulator and while spraying on water, and the granulated body is fired.

Also, although not related to a porous fired body of α-alumina, a method for manufacturing a transition alumina formed body (activated alumina formed body) (a precursor of a porous fired body) of the following arrangement is proposed in Patent Document 2 (Claim 1, Abstract, etc.).

"In a method for manufacturing a transition alumina formed body by wet forming and rehydrating a transition alumina powder, having a rehydrating property at least partially, and then firing the rehydrated formed body, a method for manufacturing a transition alumina formed body where a powder or latex, having a polymethacrylic acid ester as a main component and with a median particle diameter of 0.01 to 100 μm, is made present in the wet forming of the transition alumina powder."

In paragraph 0032 of Patent Document 2, it is stated that a mixed powder, with which methyl polymethacrylate, which is a pore forming agent, is added to a calcined rehydratable alumina, is formed (wet formed) to a spherical granulated body of 2 to 4 mm diameter using a tumbling disk granulator and while spraying on water, and the granulated body is then rehydration-processed and thereafter fired.

PRIOR ART DOCUMENTS

Patent Documents

Patent Document 1: JP2003-48768 A
Patent Document 2: JP08-245281 A

SUMMARY OF THE INVENTION

Problem(s) to be Solved by the Invention

However, with the method for manufacturing the porous fired granulated body or the precursor thereof, the granulated body, prepared by tumbling granulation, must, in either case, be rehydrated by loading in an autoclave, etc., and production man-hours and thermal energy cost are thus high. Also, such porous fired bodies are being demanded to have a higher specific surface area for pores of the same controlled diameter and have a higher strength for the same specific surface area.

An object of the present invention is to provide a porous fired granulated body of alumina and a method for manufacturing the same by which the above issues (problem and demand) can be resolved.

Means for Solving the Problem(s)

As a result of making diligent development efforts to resolve the above issues, the present inventors arrived at a porous fired granulated body (1) and a method for manufacturing the same (2) of the following arrangements.

(1) A porous fired granulated body according to the present invention is a porous fired granulated body, formed by consolidating numerous alumina particles to each other while letting mainly interconnected pores remain in network form across an entire cross section of a granulated body particle, and where the pores have an inner diameter controlled by a droplet diameter of a pore forming agent and have numerous precipitated alumina crystals formed on inner surfaces thereof.

A high specific surface area can be obtained readily because the mainly interconnected pores are formed in network form across the entire cross section of the granulated body particle, and strength and quality of the fired granulated body is readily stabilized because the pores of network form are uniform in diameter. Also, by having the numerous precipitated alumina crystals on the inner surfaces of the pores, the specific surface area is increased further. Further, by mutually facing precipitated crystals formed on the inner surfaces of the pores being fused and bonded to each other, quasi reinforcement columns are formed to increase the strength relatively.

(2) A method for manufacturing the porous fired granulated body according to the present invention includes a granulating process of using a tumbling disk granulator, including a rotating plate, to wet-granulate a raw material, constituted of an alumina fine powder, while spraying on liquid agents, and a firing process of firing a granulated body, and where the granulating process includes respective sub-processes of:

1) a process of performing primary spraying of a crystal precipitating agent on the raw material, loaded from an upper portion side opposite a discharging portion positioned at an obliquely lower portion of the rotating plate and undergoing primary tumbling circulation along an outer peripheral portion of the rotating plate, 2) a process of performing secondary spraying of a pore forming agent on the primary sprayed raw material undergoing secondary tumbling circulation at an inner side of the primary tumbling circulation, 3) a process of performing tertiary spraying of a binder on the secondary sprayed raw material undergoing tertiary tumbling circulation at an inner side of the secondary tumbling circulation, and 4) a process of making the tertiary sprayed raw material progress in granulation growth through further tumbling circulation and be particle-size-adjusted to a granulated body of a required diameter, and the primary, secondary, and tertiary spraying are respectively performed at tumbling side portions of the primary, secondary, and tertiary tumbling circulations.

With the manufacturing method described above, the granulated body after wet granulation is not required to be rehydrated by loading into an autoclave, etc., and reductions in production man-hours and thermal energy cost can be achieved. Also, by spraying the respective spray liquids at separate positions of the rotating plate, spraying amounts per unit time of the chemical agents can be adjusted and a porous fired granulated body having a specific surface area, pore diameter, and particle diameter that are uniform can be obtained readily.

If the respective spraying positions are not at the tumbling side portions of the tumbling circulations, overlapping of the respective primary and secondary tumbling circulations will be large and spraying at separate positions is made difficult.

BRIEF DESCRIPTION OF THE DRAWINGS

FIGS. 4(1), 4(2) 4(3) are model explanatory diagrams of a granulating process in a manufacturing method according to the present invention.

MODE(S) FOR CARRYING OUT THE INVENTION

A porous fired granulated body and a method for manufacturing the same according to present invention shall now be described with reference to the drawings.

Figure 1:
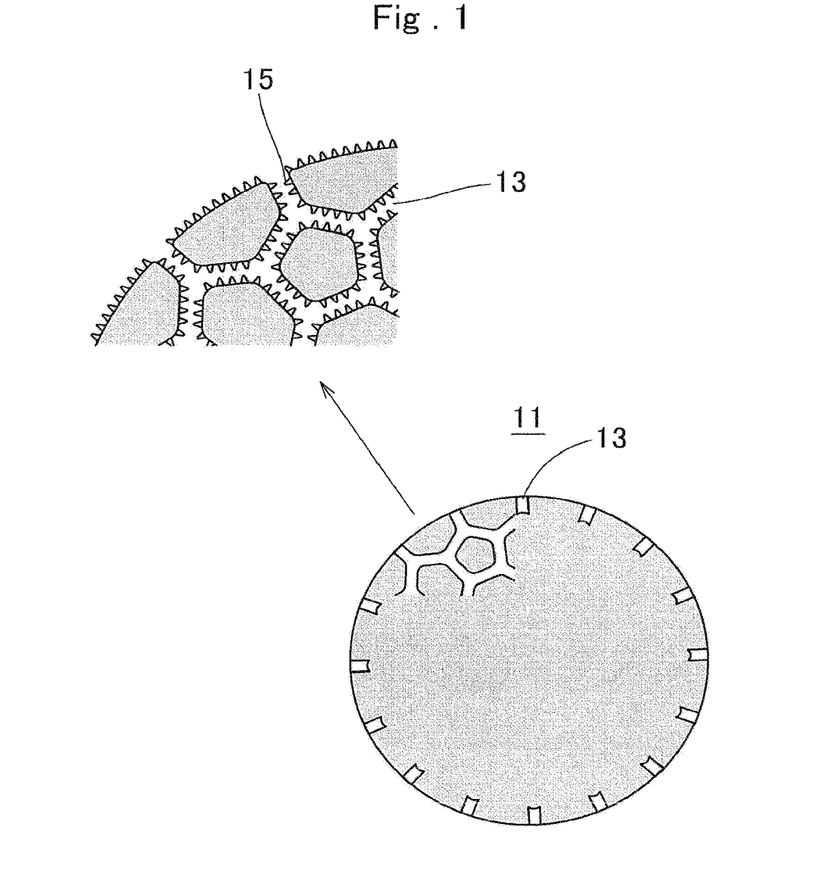
FIG. 1 is a model sectional view of a granulated body particle of a porous fired granulated body according to the present invention.

A particle 11 of the porous fired granulated body is formed by consolidating numerous alumina particles to each other while letting mainly interconnected pores (hereinafter referred to simply as "pores") 13 remain (see FIG. 1). The pores 13 have an inner diameter controlled by a droplet diameter of a pore forming agent and have numerous precipitated alumina crystals 15 formed on inner surfaces thereof.

Here, practical characteristics of the present porous fired granulated body are given below. Selection is made as appropriate from these ranges.

1) Mean particle diameter (median diameter): 0.1 to 5 mm (preferably 0.5 to 5 mm)

2) Specific surface area (BET): 0.1 to 20 $m^2/g$ (preferably 0.5 to 15 $m^2/g$)

3) Sphericity: 1.0 to 1.5

4) Pore diameter: 0.5 to 50 μm

5) Precipitated alumina crystal size (biaxial mean diameter): 0.1 to 5 μm

If the pore diameter is too large, it becomes difficult to obtain the required strength in the fired granulated particle.

The method for manufacturing the porous fired granulated body according to the present invention shall now be described based on FIGS. 2 to 5.

It shall be premised that an alumina fine powder is used as a raw material and the method includes a granulating process of using a tumbling granulator, including a rotating plate, to perform granulation while coating with chemical agents, and a firing process of firing the granulated body.

Characteristics of the alumina fine powder used as the raw material differ according to characteristics required in the porous fired granulated body that is the product. For example, in a case of use in a catalyst carrier, etc., the characteristics of being low in soda content percentage and dense in pore distribution are required of the porous fired granulated body. Therefore among calcined alumina fine powders that are relatively inexpensive, that which is put on the market as low soda alumina fine powder (α-alumina) may be used favorably. Specifically, it is preferable to use that having a soda ($Na_2O$ basis) content percentage of not more than 0.3% and more preferably not more than 0.1% and having a particle diameter (median) of 0.1 to 100 μm and more preferably 1 to 5 μm. The alumina fine powder that is the raw material may be a β alumina or a γ alumina (including ρ, χ, η, or δ).

As the chemical agents, 1) a crystal precipitating agent (primary spray liquid), 2) a pore forming agent (secondary spray liquid), and 3) a binder (tertiary spray liquid) are used. These are specifically as follows.

1) Crystal Precipitating Agent (Primary Spray Liquid):

An aluminum compound that is a dispersoid in the crystal precipitating agent may be an organic or inorganic compound. As an organic compound, aluminum lactate, aluminum alkoxide, trimethylaluminum ($Al_2(CH_3)_6$), triethylaluminum ($Al_2(C_2H_5)_6$), aluminum acetate, etc., may be used favorably, and as an inorganic compound, aluminum nitrate, aluminum chloride, etc., may be used favorably.

Among these crystal precipitating agents, an organic aluminum compound and especially aluminum lactate is preferable in being high in solubility (25° C.: 30%) and enabling easy preparation of the spray liquid. The concentration of the primary spray liquid is adjusted as appropriate in a range of 1 to 30% in accordance with required characteristics (specific surface area, compressive strength, etc.). Although the form of the spray liquid is normally a solution, it may be an emulsion or a suspension.

2) Pore Forming Agent (Secondary Spray Liquid):

Pore forming agents that may be used include those respectively with which a non-water-soluble polymer (a synthetic resin, a natural rubber, or a synthetic rubber) is dispersed in water. Water is used as a dispersion medium because control of drying rate is easy. Also as the pore forming agent, that which does not have a wetting property (that with which a contact angle is an obtuse angle) with respect to a particle surface of the primary sprayed raw material is preferable. This is because droplets of the pore forming agent do not spread on the particle surface and control of droplet diameter is easy.

As a synthetic resin, a thermoplastic resin or a thermosetting resin may be used. Specific resins that may be used favorably are those with which elimination can be performed smoothly during firing and include polyvinyl acetates (PVAC) (including copolymers), acrylic resins (polyacrylic acid esters, polymethacrylic acid esters), novolac type phenol resins, polyolefins, copolyamides, copolyesters, etc. As a synthetic rubber, polyisoprene, etc., may be used favorably.

Among the above, PVACs are preferable in enabling a spray liquid (emulsion) of satisfactory fluidity to be prepared readily. Although the form of the spray liquid is normally an emulsion, it may be a latex or a suspension.

The concentration of the secondary spray liquid, in the case of an emulsion, is 1 to 50% and preferably 5 to 15%. If the concentration is too high, it is difficult to obtain a granulated body constituted of particles of high sphericity. If the concentration is too low, it is difficult to obtain an appropriate pore diameter in the particles of the granulated body.

3) Binder (Tertiary Spray Liquid):

The binder may be an inorganic or organic agent. An organic agent that undergoes thermal decomposition or volatilization by the firing and will practically not remain in the alumina microparticles is preferable. An inorganic agent may act as a catalyst poison if it remains and may inhibit the function of the alumina crystals. Among organic agents, water-soluble organic polymers, which excel in terms of handling properties of the spray liquid, are preferable. Water-soluble organic polymers that may be used favorably include polyvinyl alcohols (PVAL), polyvinyl acetals, poly-vinylpyrrolidones, acrylic monomers, cellulose derivatives (CMC, HPC, HPMC, etc.), starches, etc.

Although the form of the tertiary spray liquid is normally an aqueous solution, it may be adjusted in volatility, as appropriate, by making a polar solvent be contained. The concentration of the tertiary spray liquid is 1 to 30% and preferably 5 to 15%. If the concentration is high, it is difficult to obtain a granulated body of high sphericity.

In the case of an organic agent, the same or same type of resin as the pore forming agent may be used and sprayed at a separate position as the binder.

4) Lubricant

As a lubricant, an inorganic or organic lubricant may be used as long as it increases the fluidity of the granulated body. An organic lubricant, which, after attachment to the granulated body, undergoes thermal decomposition or volatilization by the firing and does not require a separation operation, is preferable. Organic lubricants that may be used include synthetic resin fine powders, fatty acid esters, metal soaps, hydrocarbons (paraffin waxes, etc.), etc. Among these, synthetic resin fine powders of low water absorption percentage (for example, ASTMD 570: not more than 0.5%) are preferable. This is because handling properties are satisfactory and fluidity increasing actions are stable. Specifically, fine powders of PMMA, polyethylene, polyester (PET), etc., can be cited. A mean particle diameter of such lubricants is 1 to 50 μm.

The present invention is premised on including the granulating process of using the tumbling disk granulator, including the rotating plate, to wet-granulate the raw material, constituted of the alumina fine powder, while spraying on the liquid agents, and the firing process of firing the granulated body.

The granulating process includes respective sub processes of 1) a primary spraying process, 2) a secondary spraying process, 3) a tertiary spraying process, and 4) a particle size adjustment process, which shall be described below.

More specifically, the process is performed as described below. In the following description, the unit of spraying amount: parts/min is that with respect to 100 parts of alumina raw material powder.

Figure 2:
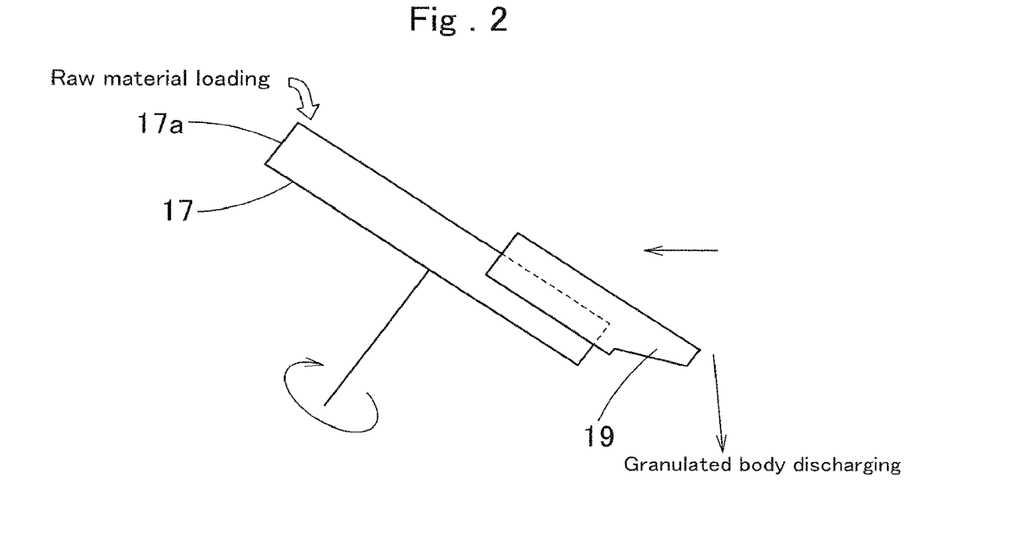
FIG. 2 is a model side view of a rotating plate of a tumbling granulator used in the present invention.
Figure 3:
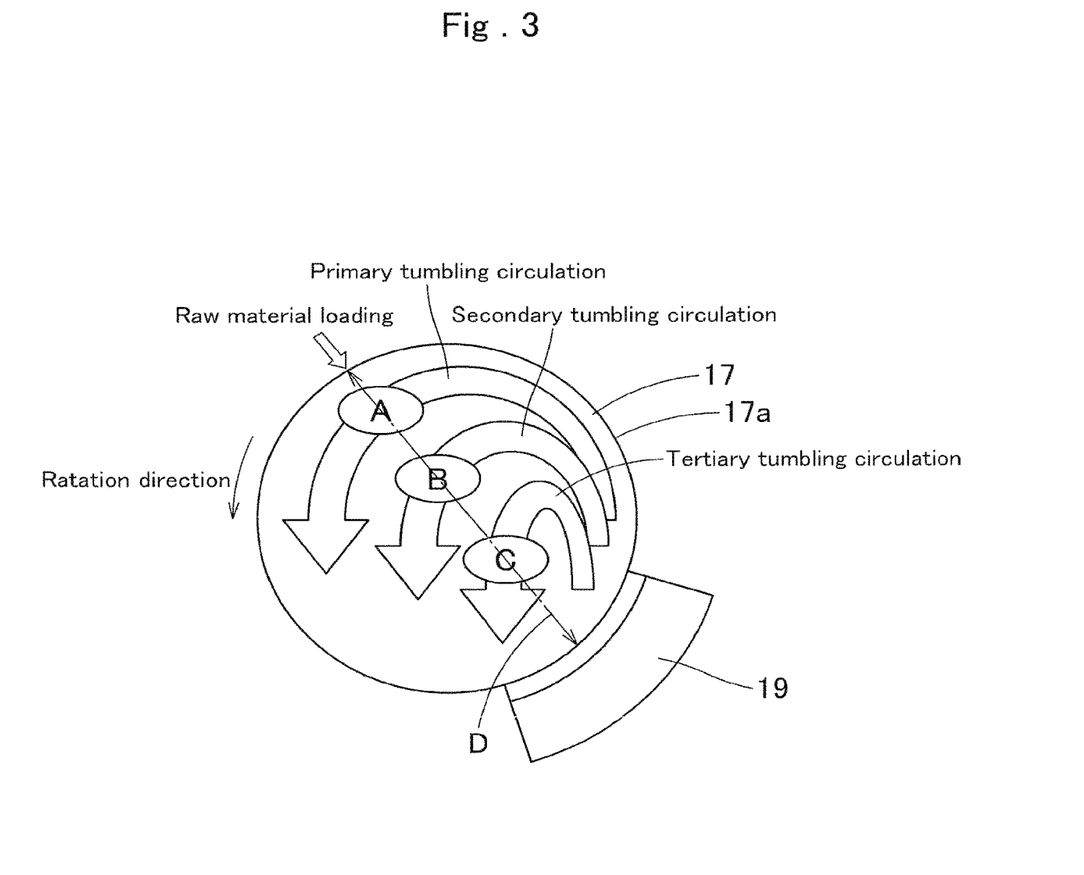
FIG. 3 is a plan view for describing actions of the same rotating plate.
Figure 4:
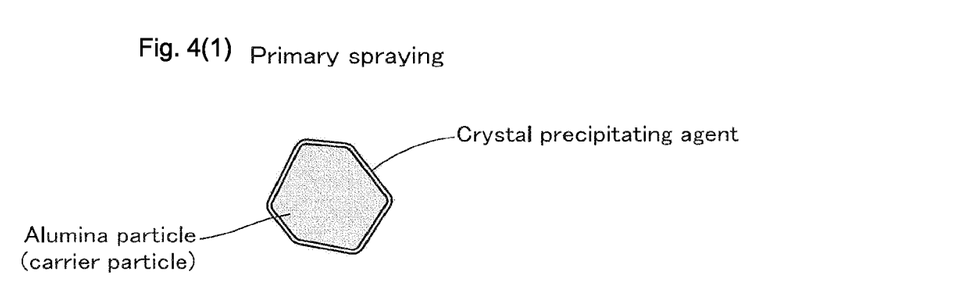

Prior to the spraying processes, etc., the primary spray liquid, the secondary spray liquid, and the tertiary spray liquid are prepared. Also, to spray on the spray liquids, the tumbling granulator is installed with three twin fluid atomizers (sprayers) (not shown) that mixingly spray the respective spray liquids and air. In the present embodiment, nozzles of the respective sprayers are disposed along a tilted diameter (tilt angle: 30 to 45°) D extending obliquely upward from a discharging portion (discharging chute 19) of the rotating plate 17. Here, the spraying nozzles are disposed along the tilted diameter D because mutual clearances (in lateral (horizontal) and vertical directions) among the sprayer nozzles can be set readily and mutual overlapping of the spray liquids is unlikely to occur during spraying.

In the illustrated example, the spraying nozzles are respectively disposed, so as to enable spraying at substantially the same width, at a primary spraying portion A zone, a secondary spraying portion B zone, and a tertiary spraying portion C zone, starting from the side of a raw material loading portion disposed opposite the discharging portion and near an outer peripheral portion of the rotating plate. In a case where an inner diameter of the rotating plate is 300 mm, each spraying width is 30 to 70 mm.

The rotating plate is made to rotate, in accordance with the mean particle diameter of the raw material, at a rotational speed in a range of 10 to 60 $min^{-1}$ and preferably 10 to 45 min$^{-1}$ and at a tilt angle in a range of 20 to 70° and preferably 40 to 70°. These conditions are adjusted as appropriate while monitoring granulation states, etc., inside the rotating plate. Outside of these rotational speed and tilt angle ranges, it becomes difficult to perform tumbling circulation while classifying the raw material, the primary sprayed raw material, the secondary sprayed raw material, and the tertiary sprayed raw material.

With particles in a wet state (green state), a repose angle will large and therefore the tilt angle must also be set to a relatively large angle.

1) Primary Spraying Process:

The raw material, which is an alumina fine powder (low soda alumina fine powder), is loaded into the raw material loading portion (upper side portion of the A zone) of the rotating plate 17 that is in operation.

The raw material undergoes primary tumbling circulation along an outer peripheral portion (inner side of a rim portion 17a) of the rotating plate 17. That is, the raw material is made to undergo the primary tumbling circulation of being lifted along the outer peripheral portion of the rotating plate by a centrifugal force to move through a lower end outer peripheral portion of the rotating plate and beyond an upper end portion of the rotating plate to an upper position of the A zone, and thereafter being made to tumble due to gravity surpassing the centrifugal force, thus being made to move in a large arc passing through the primary spraying portion A zone.

At the A zone (a tumbling side portion and preferably a portion immediately after tumbling of the primary tumbling circulation), primary spraying of the crystal precipitating agent (primary spray liquid) is performed on the raw material (see FIG. 4(1)).

At the portion immediately after tumbling, there is hardly any downward spreading of the raw material that undergoes tumbling circulation, so that spraying can be performed while the powder is high in aggregation density and spraying efficiency is satisfactory (the same applies to secondary spraying and tertiary spraying).

As spraying conditions of the primary spraying, selections are made as appropriate within ranges of droplet diameter of 10 to 1000 μm and preferably 10 to 300 μm and spraying amount per unit time of 0.01 to 4.5 parts/min and preferably 1 to 3 parts/min. A total spraying amount is set to 1 to 30 parts and preferably 1 to 25 parts with respect to 100 parts of alumina raw material powder.

If the droplet diameter is too small, a dry mist (of non-wetting droplets) is formed and coating of the respective particles of the raw material by the crystal precipitating agent is made difficult. Oppositely, if the droplet diameter is too large, a coagulation phenomenon of particles with each other occurs so that granulation occurs readily, making coating of the respective particles by the pore forming agent difficult and making formation of precipitated alumina crystals inside the pores difficult. In either case, it becomes difficult to obtain the subject matter (the porous fired granulated body having precipitated crystals in pores) of the present invention.

Also, if the spraying amount per unit time is low, working time increases, and oppositely if the spraying amount per unit time is high, the coagulation phenomenon occurs so that granulation occurs readily and it becomes difficult to obtain the subject matter (the porous fired granulated body having precipitated crystals in pores) of the present invention.

2) Secondary Spraying Process:

The primary sprayed raw material (fine powder), constituted of particles coated with the primary spray liquid, undergoes secondary tumbling circulation at an inner side of the primary tumbling circulation. That is, the primary sprayed raw material is increased in weight due to the coating of the crystal precipitating agent, so that the position at which gravity surpasses the centrifugal force moves to a foreside of that of the raw material and thus the primary sprayed raw material tumbles before reaching the upper position of the A zone to undergo the secondary tumbling circulation passing through the secondary spraying portion B zone in a medium arc.

The raw material (particle group) that was not coated by the primary spray liquid is subject to the primary tumbling circulation and subject repeatedly to the primary spraying upon reaching the A zone.

At the B zone (a tumbling side portion of the secondary tumbling circulation), the secondary spraying of the pore forming agent (secondary spray liquid) is performed on the primary sprayed raw material.

The pore forming agent causes primary granulation by causing the particles of the primary sprayed raw material to coagulate mutually and, at the same time, controls mutual gaps between the particles in accordance with the droplet size of the pore forming agent to serve an action of adjusting the diameter of pores formed in the firing process (FIG. 4(2)).

As spraying conditions of the secondary spraying, selections are made as appropriate within ranges of droplet diameter of 10 to 1000 μm and preferably 10 to 200 μm and spraying amount per unit time of 0.01 to 4.5 parts/min and preferably 1 to 3 parts/min. A total spraying amount is set to 1 to 30 parts and preferably 1 to 25 parts with respect to 100 parts of alumina raw material powder.

If the spraying amount per unit time or the total spraying amount of the pore forming agent is low, it becomes difficult to obtain a sufficient pore density or to obtain sufficient pores in the fired granulated body. Oppositely, if the spraying amount per unit time or the total spraying amount is high, a degree of variation of pore diameter and the pore density become high and the granulated shape tends to become aberrant or non-uniform.

3) Tertiary Spraying Process:

The secondary sprayed raw material, constituted of the primary granulated particles coated with the secondary spray liquid, undergoes tertiary tumbling circulation in a small arc at an inner side of the secondary tumbling circulation. That is, the secondary sprayed raw material is increased in weight due to the coating of the pore forming agent and the primary granulation, so that the position at which gravity surpasses the centrifugal force moves to a foreside of that of the primary sprayed raw material to cause tumbling and thus the secondary sprayed raw material tumbles before reaching the upper position of the B zone to undergo the tertiary tumbling circulation passing through the tertiary spraying portion C zone in a small arc.

The particle group that was not coated by the secondary spray liquid is subject to the secondary tumbling circulation and subject repeatedly to the secondary spraying upon reaching the B zone.

At the C zone (a tumbling side portion of the tertiary tumbling circulation), the tertiary spraying of the binder (tertiary spray liquid) is performed on the secondary sprayed raw material (primary granulated body).

The binder causes the granulated body particles of the secondary sprayed raw material (primary granulated body) to bind to each other and be made into a secondary granulated body (coarse grains).

As spraying conditions of the tertiary spraying, selections are made as appropriate within ranges of droplet diameter of 10 to 1000 μm and preferably 10 to 300 μm and spraying amount per unit time of 0.01 to 4.5 parts/min and preferably 1 to 3 parts/min. A total spraying amount is set to 1 to 30 parts and preferably 1 to 15 parts with respect to 100 parts of alumina raw material powder.

If the spraying amount per unit time or the total spraying amount of the pore forming agent is low, it becomes difficult to obtain a secondary granulated body (coarse grains) of sufficient granularity (size) and becomes difficult to obtain pores of network form in the fired granulated body. Oppositely, if the spraying amount per unit time or the total spraying amount is high, it also becomes difficult to obtain pores of network form in the fired granulated body.

4) Particle Size Adjustment Process:

The tertiary sprayed raw material, with which the primary granulated particles are coated with the tertiary spray liquid, undergoes tumbling circulation of passing through a portion close to an inner side of the C zone that substantially overlaps with the tertiary tumbling circulation and is meanwhile subjected repeatedly to the tertiary spraying so as to progress in granulation growth and be particle-size-adjusted to a secondary granulated body (product granulated body) of a required diameter. Thereafter, the product granulated body (secondary granulated body) is discharged from the discharge chute 19.

In loading the raw material additionally, it is preferable to add the lubricant. This is because the respectively sprayed raw materials will then be prevented from attaching to the rotating plate rim and disintegration of the raw material will be performed more smoothly. The amount of lubricant added at this point is set to 1 to 50 parts and preferably 10 to 40 parts with respect to 100 parts of the additionally loaded raw material.

Next, the product granulated body prepared as described above is fired by performing a firing processing using an electric furnace, etc.

Here, the crystal precipitating agent coating the alumina microparticles dries after spraying so that the aluminum compound undergoes precipitation growth and further becomes the precipitated alumina crystals of γ-alumina and furthermore α-alumina due to the firing.

The firing conditions in this process are as follows.

A temperature rising rate is set to 100 to 700° C./h and preferably 200 to 400° C./h. If the temperature rising rate is too high, cracks tend to form in the fired body. Oppositely, if the rate is too low, productivity decreases.

Figure 5:
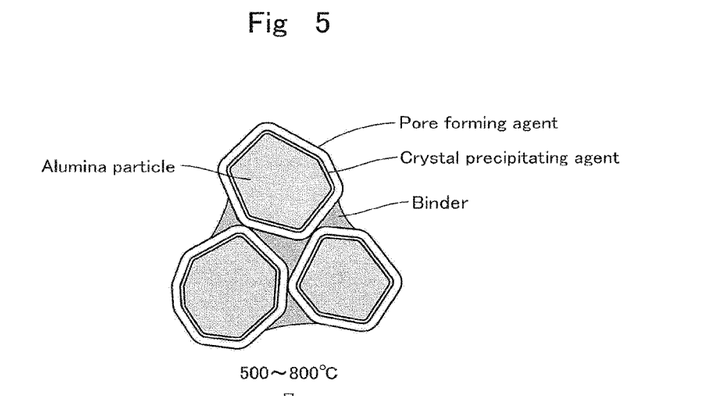
FIGS. 5, 5A, 5B, 5C, and 5D are model explanatory diagrams of a firing process of the same.
Figure 5A:
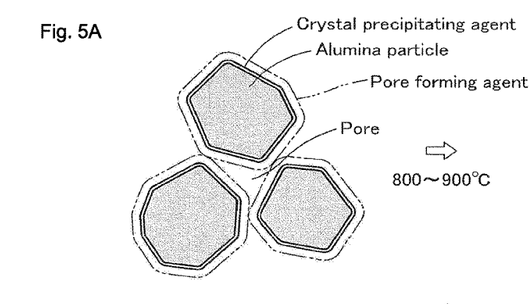
Figure 5B:
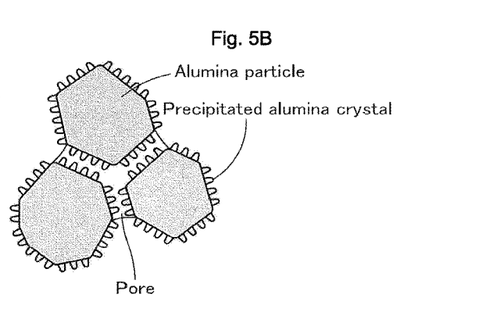
Figures 5C, 5D:
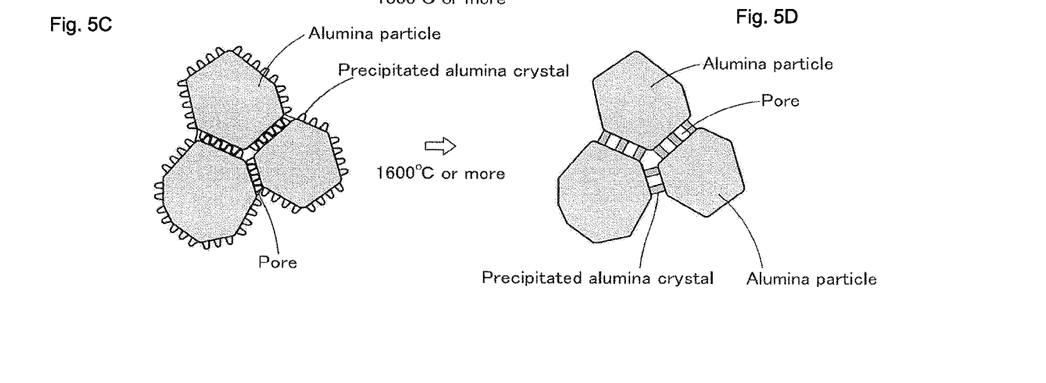

An attained temperature and holding time, in a case of forming precipitated crystals of γ-alumina, are set to 500 to 1300° C.×1 to 24 h and preferably 600 to 1100° C.×1 to 20 h. Also, these are set, in a case of forming precipitated crystals of α-alumina, to 1000 to 2000° C.×0.1 to 3 h and preferably 1650 to 1850° C.×0.5 to 1 h. A model of a firing process for forming precipitated crystals of α-alumina is shown in FIG. 5.

In the firing process, as shown in FIGS. 5A, 5B, 5C, and 5D, as sintering progresses, the granulated body particles shrink, the pore diameter also becomes reduced, the compressive strength increases gradually, and further, mutually facing precipitated crystals become fused mutually so that the compressive strength increases further. The pores, having precipitated crystals of alumina in interiors, are thereby formed in network form across an entire cross section of each granulated body particle as shown in FIG. 1.

Although a case where the raw material is an alumina fine powder was described above as an example, the present invention also covers (1) a ceramic fine powder fired body with the below-described arrangement where the alumina fine powder is replaced by a ceramic fine powder and (2) a method for manufacturing the same.

(1) A porous fired granulated body, formed by consolidating numerous ceramic particles to each other while letting mainly interconnected pores remain in network form across an entire cross section of a granulated body particle, and where the pores have an inner diameter controlled by a droplet diameter of a pore forming agent and have numerous precipitated alumina crystals formed on inner surfaces thereof.

(2) A method for manufacturing the above-described porous fired granulated body including a granulating process of using a tumbling disk granulator, including a rotating plate, to wet-granulate a raw material, constituted of a ceramic fine powder, while spraying on liquid agents, and a firing process of firing a granulated body, and where the granulating process includes respective sub-processes of:

1) a process of performing primary spraying of a crystal precipitating agent on the raw material, loaded from an upper portion side opposite a discharging portion positioned at an obliquely lower portion of the rotating plate and undergoing primary tumbling circulation along an outer peripheral portion of the rotating plate, 2) a process of performing secondary spraying of a pore forming agent on the primary sprayed raw material undergoing secondary tumbling circulation at an inner side of the primary tumbling circulation, 3) a process of performing tertiary spraying of a binder on the secondary sprayed raw material undergoing tertiary tumbling circulation at an inner side of the secondary tumbling circulation, and 4) a process of making the tertiary sprayed raw material progress in granulation growth through further tumbling circulation and be particle-size-adjusted to a granulated body of a required diameter, and the primary, secondary, and tertiary spraying are respectively performed at tumbling side portions of the primary, secondary, and tertiary tumbling circulations.

As the ceramic that is to be the raw material (fine powder), magnesium oxide (MgO), zirconium oxide ($ZrO_2$), titanium oxide ($TiO_2$), calcium oxide (CaO), beryllium oxide (BeO), etc., can be cited.

EXAMPLES

An Example carried out along with Comparative Examples to confirm the effects of the present invention shall now be described. As the tumbling granulator, that including a pan type rotating plate with an inner diameter of 300 mm was used for the Example and Comparative Examples 1 and 2. The A zone, B zone, and C zone, which are the respective spraying zones in the rotating plate 15, were set as shown in FIG. 3 described above and a width of each spraying zone was set to 50 mm.

The raw material and chemical agents used and specifications thereof are as follows.

1) Raw Materials

Calcined alumina fine powder (low soda alumina) • • • Mean particle diameter: 2.5 μm; $Na_2O$: 0.08%; specific surface area: 1.4 g/m$^2$ Activated alumina • • • Mean particle diameter: 1.5 μm; $Na_2O$: 0.45%; specific surface area: 1.5 g/m$^2$ 2) Chemical Agents Crystal precipitating agent (primary spray liquid) • • • 30% aqueous solution of aluminum lactate Pore forming agent (secondary spray liquid) • • • 10% emulsion of PVAC (mean particle diameter: 10 µm); PVAC particle diameter: 1 µm Binder (tertiary spray liquid) • • • 10% aqueous solution of PVAL Lubricant • • • PMMA fine powder (mean particle diameter: 5 µm)

EXAMPLE

To a rotating plate adjusted to a tilt angle of 55° and rotating at 25 $min^{-1}$, 100 g of the low soda alumina, which is the raw material, is loaded from a raw material loading portion (above the A zone), and thereafter the rotating plate is started and the rotational speed and the tilt angle are adjusted so that appropriate tumbling circulation occurs with the raw material powder. The adjustment ranges were set to 25 to 35 $min^{-1}$ for the former and to 55 to 62° for the latter.

1) At the A zone, the primary spray liquid was sprayed onto the raw material undergoing the primary tumbling circulation. In this process, spraying was performed with spraying pressure and spraying amount per unit time being adjusted so that the droplet diameter will be 10 µm. The total spraying amount in this process was set to 20 parts with respect to 100 parts of the raw material. In the present Example, the spray amount per unit time was set to 2.5 parts/min and therefore the total spraying time was 8 minutes.

2) At the B zone, the pore forming agent (secondary spray liquid) was sprayed onto the primary sprayed raw material undergoing the secondary tumbling circulation. The total spraying amount of the secondary spray liquid in this process was set to 20 parts with respect to 100 parts of the raw material. The spray amount per unit time of the secondary spray liquid was set to 2.5 parts/min so as to correspond to the total spraying time of 8 minutes of the primary spray liquid. This was done to perform simultaneous spraying and enable continuous granulation.

3) At the C zone, the binder (tertiary spray liquid) was sprayed onto the secondary sprayed raw material undergoing the tertiary tumbling circulation. The total spraying amount of the binder in this process and including the subsequent particle size adjustment process was set to 10 parts (in terms of solid content) with respect to 100 parts of the raw material. The spray amount per unit time of the tertiary spray liquid was set to 2.5 parts/min so as to correspond to the total spraying time of 8 minutes of the primary and secondary spray liquids. This was done to perform simultaneous spraying and enable continuous granulation.

4) The tertiary sprayed raw material is subjected repeatedly to tumbling circulation passing through the portion close to the inner side of the C zone and particle-size-adjusted until a required granulation diameter (mean particle diameter: 2 mm) is attained by granulation growth.

Immediately before, that is, in the present Example, 10 minutes before the completion of the secondary granulation, which is a final stage of the particle size adjustment, a material with 5 parts of the lubricant added to 20 parts of the raw material was loaded dividedly from the raw material loading portion so that a loading amount per unit time was 2.5 parts/min.

During the operation of the tumbling granulation, the temperatures and spraying amounts per unit time of the spray liquids were adjusted so that the temperature in the rotating plate was not more than 28° C. and not less than 18° C. This is because if the temperature is too high or too low, the volatilization rates of the spray liquids will be too fast or too slow and granulation will not be performed smoothly. An electrothermal heater was disposed in non-contacting manner at a rear side position of the rotating plate because the temperature inside the rotating plate decreases due to heat of vaporization.

Next, the wet granulated body prepared thus was raised in temperature at a temperature rising rate of 300° C./h to an attainment temperature of 900° C., further raised in temperature at the same temperature rising rate to an attainment temperature of 1650° C., and held there for 0.5 h and thereby made into a fired body.

Comparative Example 1

In the Example described above, 100 g of activated alumina ($Na_2O$: 0.45%; median particle diameter: 1.5 µm; specific surface area: 200 $m^2/g$) were loaded as the raw material, and while subjecting the raw material to tumbling circulation under the same conditions and without performing the primary and secondary spray coatings, the binder (10% aqueous solution of PVAL) was sprayed at the A zone at a spraying amount per unit time of 25 g (2.5 g as solids)/min for a total time of 4 min to attain a total spraying amount of 100 g (10 g as solids).

The wet granulated body prepared thus was fired under the same conditions as in the Example.

Comparative Example 2

In Comparative Example 1, the low soda alumina used in the Example was used as the raw material and the wet granulated body obtained by performing tumbling granulation in the same manner was fired under the same conditions.

The respective specific surface areas, soda components, and compressive strengths (particle strengths) of the Example and Comparative Examples 1 and 2 were measured and these are shown in Table 1.

TABLE 1

|  | Example | Comparative Example 1 | Comparative Example 2 |
| --- | --- | --- | --- |
| Raw material specific surface area | 1.4 $m^2/g$ | 200 $m^2/g$ | 1.4 $m^2/g$ |
| Fired body specific surface area | 3.9 $m^2/g$ | 3.4 $m^2/g$ | 0.03 $m^2/g$ |
| Specific surface area difference (Δ) | 2.5 $m^2/g$ | 196.6 $m^2/g$ | 1.37 $m^2/g$ |
| Raw material $Na_2O$ component | 0.08% | 0.45% | 0.08% |
| Fired body $Na_2O$ component | 0.02% | 0.45% | 0.03% |
| Particle strength | 5.3 kgf/particle | 0.1 kgf/particle | 5.5 kgf/particle |

The following has become clear from the results of the Example and Comparative Examples 1 and 2.

(1) The particle strength of the Example was not only significantly higher than the fired body (Comparative Example 1) having activated alumina powder as the raw material but was also substantially equivalent to the fired body (Comparative Example 2) prepared by a conventional method using the same low soda alumina as the Example as the raw material. This is presumed to be because blocking due to the high temperature firing (sintering) did not occur due to the presence of the precipitated alumina crystals in the pores.

(2) The specific surface area of the Example is slightly higher than that of Comparative Example 1 and significantly higher than the fired body (Comparative Example 2) prepared by the conventional method using the same low soda alumina as the Example as the raw material. Also, the decrease of specific surface area of Comparative Example 1 is presumed to be due to blocking of the pores of activated alumina by the sintering.

(3) The soda component of the Example was approximately ¼ that of the raw material and not only significantly lower than that of Comparative Example 1 but was also even lower than that of Comparative Example 2. The decrease of soda component in the Example and Comparative Example 2 is presumed to be due to volatilization of the soda component due to the high temperature firing (sintering).

Figure 6A:
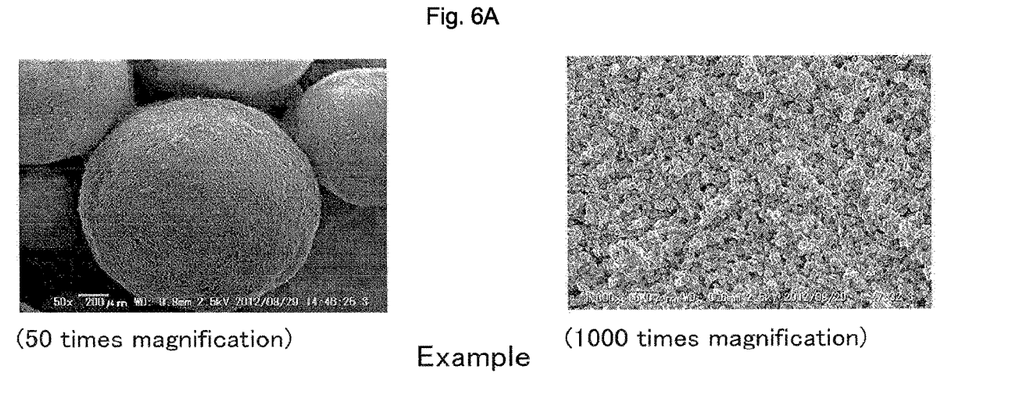
FIGS. 6A, 6B, and 6C show SEM photographs (50 times magnification) and enlarged SEM photographs (1000 times magnification) of respective fired granulated bodies of an Example and Comparative Examples 1 and 2, respectively.
Figure 6B:
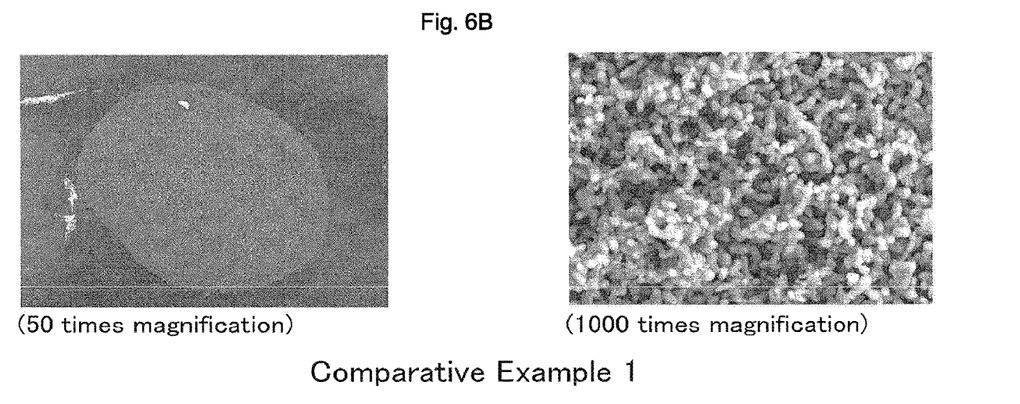
Figure 6C:
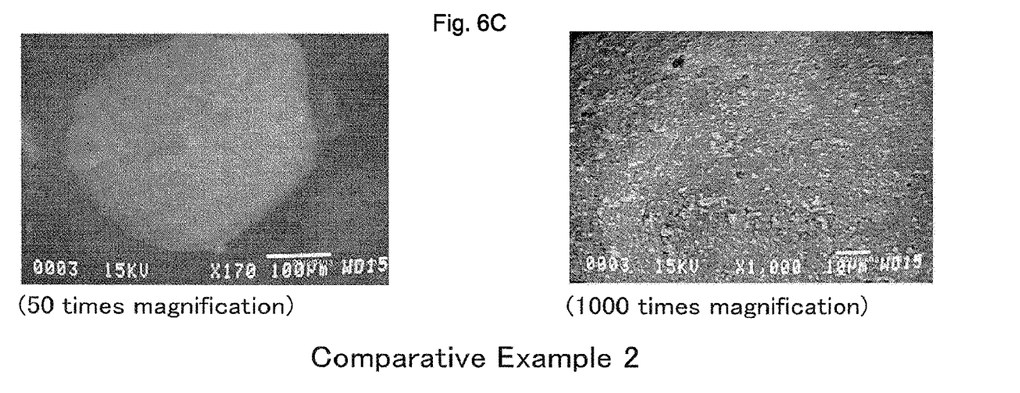

Scanning electron microscope (SEM) photographs of the granulated bodies of the respective Example and Comparative Examples were taken at low magnification and high magnification. These SEM photographs are shown in FIGS. 6A, 6B, and 6C. From the SEM photographs of FIG. 6, it can be understood that the Example of the present invention does not differ much in sphericity from Comparative Examples 1 and 2 but is more uniform in pore density in comparison to Comparative Examples 1 and 2.

DESCRIPTION OF THE SYMBOLS

11 Particle of porous fired granulated body
13 Pore
15 Precipitated alumina crystal

The invention claimed is:

1. A method for manufacturing a porous fired granulated body comprising alumina particles consolidated to each other while letting interconnected pores remain in network form across an entire cross section of a granulated body particle, wherein the pores have an inner diameter controlled by a droplet diameter of a pore forming agent and have precipitated alumina crystals formed on inner surfaces thereof, the method for manufacturing the porous fired granulated body comprising: a granulating process of using a tumbling disk granulator, including a rotating plate, to wet-granulate a raw material comprising an alumina powder, while spraying on liquid agents; and a firing process of firing a granulated body; and
wherein the granulating process includes respective sub-processes of:
1) a process of performing primary spraying of a crystal precipitating agent on the raw material undergoing primary tumbling circulation along an outer peripheral portion of the rotating plate,
2) a process of performing secondary spraying of a pore forming agent on the primary sprayed raw material undergoing secondary tumbling circulation at an inner side of the primary tumbling circulation,
3) a process of performing tertiary spraying of a binder on the secondary sprayed raw material undergoing tertiary tumbling circulation at an inner side of the secondary tumbling circulation, and
4) a process of making the tertiary sprayed raw material progress in granulation growth through further tumbling circulation and adjusting particle size of the granulated body particle to a required diameter, and the primary, secondary, and tertiary spraying are respectively performed at tumbling side portions of the primary, secondary, and tertiary tumbling circulations.

2. The method for manufacturing the porous fired granulated body according to claim 1, wherein the raw material is an alumina powder with an $Na_2O$ content of not more than 0.3%.

3. The method for manufacturing the porous fired granulated body according to claim 2, wherein the alumina powder is a calcined alumina powder with an $Na_2O$ content of not more than 0.1% and a median particle diameter of 0.1 to 100 μm.

4. The method for manufacturing the porous fired granulated body according to claim 1, wherein a lubricant is added simultaneously in loading the raw material into a loading portion of the rotating plate in a batch or continuously.

5. The method for manufacturing the porous fired granulated body according to claim 1, wherein a content of a soda component, in terms of $Na_2O$, is less than 0.03%.

6. The method for manufacturing the porous fired granulated body according to claim 1, wherein a pore diameter of pores in the granulated body particle is adjusted to be in a range of 0.5 to 50 μm and a biaxial mean diameter (arithmetic mean of major diameters and minor diameters) of the precipitated alumina crystals is 0.1 to 5 μm.

7. The method for manufacturing the porous fired granulated body according to claim 6, wherein a mean particle diameter (median diameter) of the granulated body particle is 0.1 to 5 mm and a specific surface area (BET method) is 0.1 to 20 $m^2/g$.

8. A method for manufacturing a porous fired granulated body comprising ceramic particles consolidated to each other while letting interconnected pores remain in network form across an entire cross section of a granulated body particle, and wherein the pores have an inner diameter controlled by a droplet diameter of a pore forming agent and have precipitated alumina crystals formed on inner surfaces thereof, the method for manufacturing the porous fired granulated body comprising: a granulating process of using a tumbling disk granulator, including a rotating plate, to wet-granulate a raw material comprising a ceramic powder, while spraying on liquid agents; and a firing process of firing a granulated body; and
wherein the granulating process includes respective sub-processes of:
1) a process of performing primary spraying of a crystal precipitating agent on the raw material undergoing primary tumbling circulation along an outer peripheral portion of the rotating plate,
2) a process of performing secondary spraying of a pore forming agent on the primary sprayed raw material undergoing secondary tumbling circulation at an inner side of the primary tumbling circulation,
3) a process of performing tertiary spraying of a binder on the secondary sprayed raw material undergoing tertiary tumbling circulation at an inner side of the secondary tumbling circulation, and
4) a process of making the tertiary sprayed raw material progress in granulation growth through further tumbling circulation and adjusting particle-size of the granulated body particle to a required diameter, and
the primary, secondary, and tertiary spraying are respectively performed at tumbling side portions of the primary, secondary, and tertiary tumbling circulations.

* * * * *